United States Patent
Abhinkar et al.

(10) Patent No.: US 7,624,428 B2
(45) Date of Patent: Nov. 24, 2009

(54) APPARATUS AND METHOD FOR PLATFORM-INDEPENDENT IDENTITY MANAGEABILITY

(75) Inventors: Sameer Abhinkar, Beaverton, OR (US); Selim Aissi, Beaverton, OR (US); Jane Dashevsky, Beaverton, OR (US); Abhay Dharmadhikari, Beaverton, OR (US); Benjamin J. Matasar, Portland, OR (US); Mrudula Yelamanchi, Portland, OR (US); Scott Blum, Beaverton, OR (US); Shelagh Ann Callahan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 831 days.

(21) Appl. No.: 11/171,080

(22) Filed: Jun. 30, 2005

(65) Prior Publication Data

US 2007/0006281 A1    Jan. 4, 2007

(51) Int. Cl.
*H04L 9/32* (2006.01)
*H04L 9/00* (2006.01)
*G06F 7/04* (2006.01)

(52) U.S. Cl. .................. 726/2; 726/27; 726/28; 726/29; 726/30; 713/151; 713/152; 713/153; 709/225; 709/226; 709/227; 709/228; 709/229

(58) Field of Classification Search .......... 726/2
See application file for complete search history.

(56) References Cited

U.S. PATENT DOCUMENTS

| | | | |
|---|---|---|---|
| 6,851,052 B1 | 2/2005 | Graveman | |
| 7,177,424 B1 | 2/2007 | Furuya et al. | |
| 7,346,923 B2 * | 3/2008 | Atkins et al. | 726/6 |
| 7,376,826 B2 | 5/2008 | Tardo et al. | |
| 7,400,722 B2 | 7/2008 | Qi et al. | |
| 7,424,615 B1 | 9/2008 | Jalbert et al. | |
| 7,464,267 B2 | 12/2008 | Zhu et al. | |
| 7,480,939 B1 | 1/2009 | Nessett et al. | |
| 7,487,549 B2 | 2/2009 | Kawamoto et al. | |
| 7,492,894 B2 | 2/2009 | Kitani et al. | |
| 2005/0289341 A1 * | 12/2005 | Ritola et al. | 713/168 |

* cited by examiner

*Primary Examiner*—Longbit Chai
(74) *Attorney, Agent, or Firm*—Blakely, Sokoloff, Taylor & Zafman LLP

(57) ABSTRACT

An apparatus and method for platform and device independent identity manageability. In one embodiment, the method includes validation of a manageable identity (MID) held within trusted storage of a user platform according to a user request to move the MID to a target platform. Once the MID is validated, available resources of the target platform are verified according to resource requirements of the MID. Once verified, the MID may be moved from the user platform to trusted storage provided by the target platform. In one embodiment, a platform-independent MID may be established that may be moved from a user platform to a non-compatible target platform, such that the platform-independent MID is not constrained to just one single platform. Other embodiments are described and claimed.

20 Claims, 7 Drawing Sheets

US 7,624,428 B2

APPARATUS AND METHOD FOR PLATFORM-INDEPENDENT IDENTITY MANAGEABILITY

FIELD

One or more embodiments relate generally to the field of integrated circuit and computer system design. More particularly, one or more of the embodiments relate to a method and apparatus for platform and device independent identity manageability.

BACKGROUND

As the world grows increasingly digital, the number of digital identities required to access the digital world are continually increasing. These digital identities may be associated with multiple devices, networks, services and organizations. Unfortunately, mechanisms for managing these identities, including the credentials used to access our devices and services, and the policies controlling where and how we expose our identities are lacking.

The sheer number of digital identities required for accessing the digital world is reaching the point where they are becoming personally and organizationally difficult to manage. For instance, a person might have: (1) personal identities such as a driver's license, social security number or passport; (2) identities related to devices, such as passwords to get into computers, personal digital assistants (PDA), cellular telephones and answering machines; (3) log-ins to access home networks, enterprise networks, wireless hotspots and cellular networks; and (4) accounts to access the web, e-mail, on-line businesses (e.g., eBay and Amazon), instant messaging, short message service (SMS), and voice message services.

Whether it is trying to remember a user name and a password, or keying in a wireless access code, people experience daily problems dealing with the multitudinous identities required for access to their devices, networks and services. As a result, people look for ways to simplify their identities. Often, management of such identities results in reuse of the same password for each account of a user. Others maintain long, easily stolen lists of the user names and passwords. As a result, the multitudinous digital identities required for access to devices, networks and services are creating trouble for individuals to easily keep track of such information, while jeopardizing protection against unauthorized access to their devices, networks and services.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
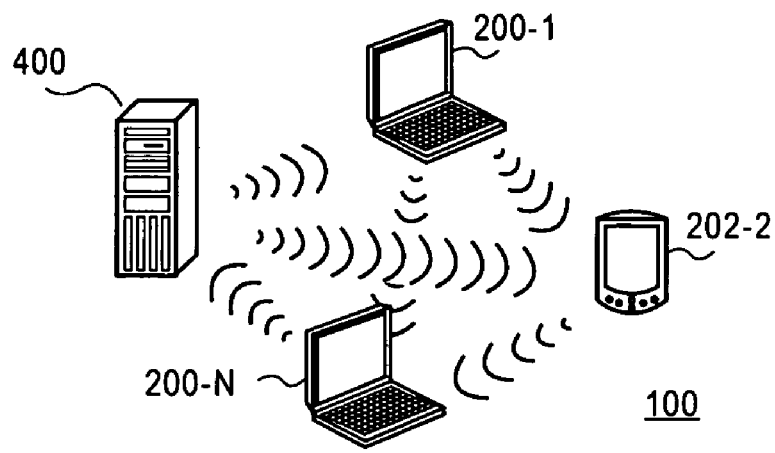
FIG. 1 is a block diagram illustrating a peer-to-peer wireless network configuration for platform-independent identity management, in accordance with one embodiment.

A method and apparatus for platform-independent identity manageability are described. In one embodiment, the method includes validation of a manageable identity (MID) held within trusted storage of a user platform according to a user request to move the MID to a target platform. Once the MID is validated, available resources of the target platform are verified according to resource requirements of the MID. Once verified, the MID may be moved from the user platform to trusted storage provided by the target platform. In one embodiment, a platform-independent MID may be established that may be moved from a user platform to a non-compatible target platform, such that the platform-independent MID is not constrained to just one single platform.

In the following description, certain terminology is used to discuss features of the present invention. As described herein, the term "wireless client" or "client" is used to refer to wireless devices including, but not limited to, personal computers including laptop computers, equipped with wireless adapter cards, as well as personal digital assistants (PDAs), appliances, and the like devices configured to communicate via a wireless communications medium such as, for example, radio frequency (RF) waves. Furthermore, as described herein, the term "wireless station" or "station" is used to refer to devices including, but not limited to, wireless base stations, wireless access points (AP), computers such as server computers, personal computers, laptops, PDAs, or like devices configured to restrict access to stored information contained therein or to an attached wired network.

As described herein, a "platform" includes any product that performs operations for subsequent analysis and verification of the platform's operations. Examples of the platform include, but are not limited or restricted to a computer (e.g., desktop, a laptop, a server, a workstation, a personal digital assistant or other held-held, etc.); communication equipment (e.g., wireless handset, facsimile, cellular phone, etc.); a television set-top box; a wireless client, wireless station and the like. A "link" is broadly defined as one or more information-carrying mediums such as electrical wire, optical fiber, cable, trace, or even a wireless channel using infrared, radio frequency (RF), or any other wireless signaling mechanism.

In addition, the term "information" is defined as one or more bits of data, address, and/or control. A "software module" includes code that, when executed, performs a certain function. Examples of a software module include an application, an applet, or even a series of code instructions, possibly a subset of code from an applet, acting as a lesser sized software module.

A "cryptographic operation" is an operation performed for additional data security. For example, one type of cryptographic operation involves digital signing information to produce a digital signature. This digital signing operation may be in accordance with Digital Signature Algorithm (DSA). Another type of cryptographic operation involves hashing, namely a one-way conversion of information to a fixed-length representation. Often, this representation, referred to as a "hash value" or an "identifier", is substantially less in size than the original information. It is contemplated that, in some cases, a 1:1 conversion of the original information may be performed.

System

Figure 2:
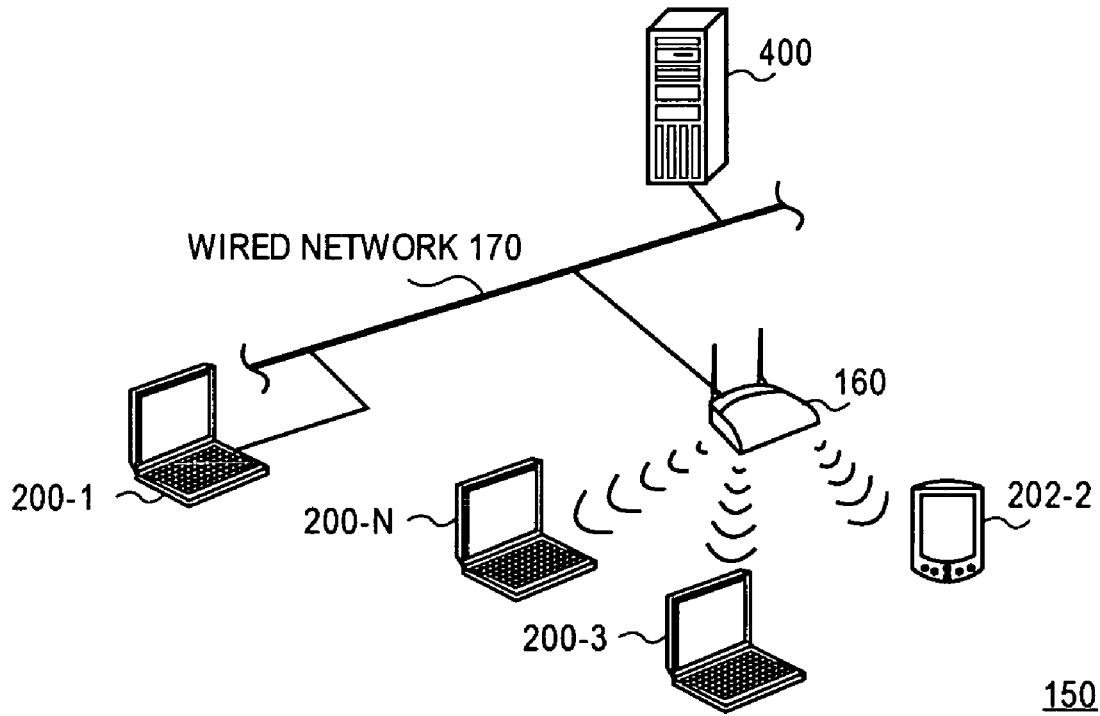
FIG. 2 is a block diagram illustrating a wireless network (WLAN) configuration for platform-independent identity management, in accordance with one embodiment.

FIG. 1 is a block diagram illustrating a peer-to-peer (ad-hoc) configuration for a wireless network 100, in accordance with one embodiment of the invention. FIG. 2 illustrates an infrastructure mode or basic service set (BSS) wireless local area network (WLAN) configuration 150, in accordance with one embodiment. In embodiments depicted in FIGS. 1 and 2, wireless networks 100 and 150 may be configured according to a "wireless protocol" including, but not limited to the Institute of Electrical and Electronic Engineers (IEEE) 802.11 Standard (e.g., IEEE Std. 802.11-1997, 802.11a, 802.11.e, 802.11n, etc.), Hyper LAN 2 and future potential standards for any point-to-point wireless link or network.

As shown in FIG. 1, network 100 is configured according to an ad hoc mode as independent basic service set (IBSS). Representatively, two or more wireless clients 200 (200-1, . . . , 200-N) are equipped with, for example, wireless adapter cards to communicate within wireless network 100 as well as server computer 400. As illustrated in FIG. 2, in the infrastructure mode, each client 200 sends all communications to a WLAN access point (station) 160. As such, the clients 200 communicate with station 160, which acts as a bridge to resources of a wired network 170, such as server computer 400. Wired network 170 may implement a local area network (LAN) using an Ethernet protocol, Home Plug protocol, or the like.

As illustrated in FIGS. 1 and 2, and as described herein, server computer is referred to as "manageable identity (MID) manager platform" 400, which may participate in wireless network 100, as shown in FIG. 1, or may be coupled to wired network 170, as shown in FIG. 2. Also illustrated in FIGS. 1 and 2 is wireless client 200-1, referred to herein as "user platform" 200-1. Likewise, as shown in FIGS. 1 and 2, wireless client 200-2, referred to herein as "target platform" 200-2, may participate within wireless network 100 or access wired network 170 via station access point 160. In one embodiment, user platform 200-1, target platform 200-2 and MID manager platform 400, as shown in FIGS. 1 and 2, are configured to provide platform-independent identity manageability, according to one embodiment.

As shown in FIG. 2, prior to participation in WLAN 150, target platform 200-2 and access point (station) 160 establish a relationship or an association. To associate with station 160 and WLAN 150, target platform 200-2 may listen for beacon messages to identify stations within range. In one embodiment, wireless network 100 and WLAN 150, as shown in FIGS. 1 and 2, may be governed by the wired equivalency protocol (WEP) or other like authentication protocol.

Referring again to FIGS. 1 and 2, after identifying station 160, target platform 200-2 and station 160 may perform a mutual authentication by exchanging several management frames as part of the process. The WEP protocol provides two mechanisms for authentication, open system authentication and shared key authentication. Generally, open system authentication, for example, as used by wireless network 100, provides access to anyone that requests authentication by providing a null authentication process. Conversely, shared key authentication uses a standard challenge and response being based upon knowledge of secret keys to provide authentication.

After successful authentication, target platform moves from an authenticated and unassociated, first state into an authenticated and unassociated, second state. Moving from the second state to an authenticated and associated, final state involves target platform 200-2 sending an association request frame and the station 160 responding with an association response frame. Accordingly, access to the wireless networks 100 and 150, as shown in FIGS. 1 and 2, is just one example where an identity of both the users and their devices must be provided to gain access.

On the Internet, user and device identities have several definitions: Username/password, certificates, SIM, smart card, etc. Furthermore, the multitude of devices available in the market for access to the digital world requires identities mapping to these plethora of available devices. As a result, a user may have multiple devices to enable access to the digital world. Consequently, each available manageable identity or MID cannot be constrained to just one single device.

As described herein, a manageable identity, or MID, is defined as a set of components (hardware and software dependent) comprising of assertions (e.g., username/passwords, digital certificate, etc.), preferences, resource-dependencies, mechanisms that use the assertions, and the policies that define the access levels for the MID. Accordingly, as described herein, a platform independent MID forms a shell around the device/user identity. In one embodiment, a platform-independent MID may be established that may be moved from a user platform to a non-compatible target platform, such that the platform-independent MID is not constrained to just one single platform.

Figure 3:
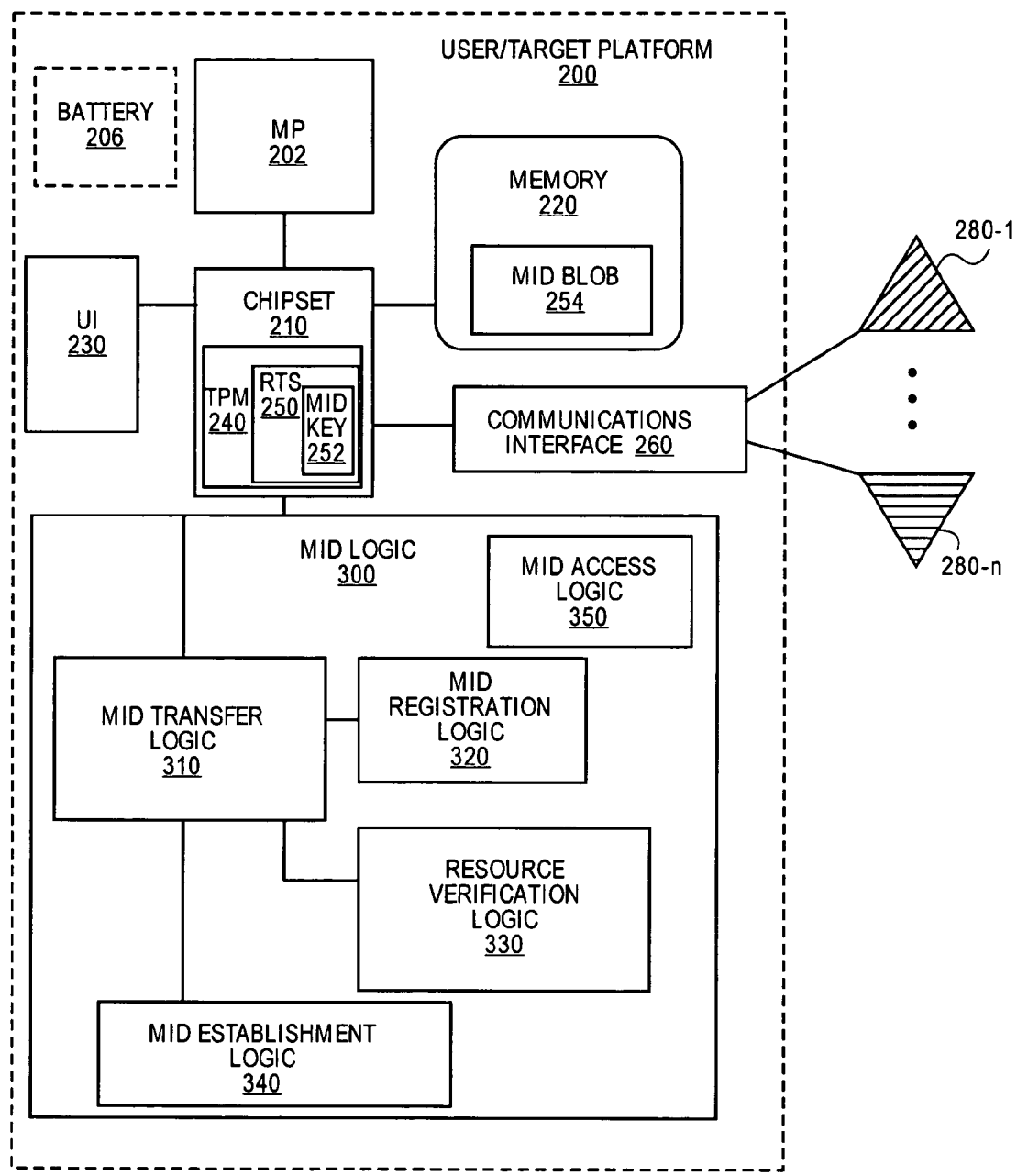
FIG. 3 is a block diagram illustrating a wireless configuration of a manageable identification (MID) manager platform for platform-independent identity management, in accordance with one embodiment.

FIG. 3 is a block diagram illustrating user/target platform 200, including MID logic 300 to provide platform-independent MIDs, in accordance with one embodiment. Representatively, user/target platform 200 may include optional battery 206, a microprocessor 202, which uses chipset 210 to access main memory 220, user interface (UI) 230 and communications interface 260. In one embodiment, memory 200 includes, but is not limited to random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data. As described herein, the term "chipset" is used in a manner well know to those of ordinary skill in the art to describe, collectively, the various devices coupled to CPU 202 to perform desired system functionality.

In one embodiment, communications interface 260 is, for example, a wireless adapter card, which operates according to a multiple input/multiple output (NMMO) operation. In accordance with such an embodiment, user/target platform 200 includes multiple transmit (TX) and receive (RX) antennas 280 (280-1, . . . , 280-N). Representatively, user/target platform 200 provides multiple TX and RX antennas. In one embodiment, medium access control (MAC) layer functionality and physical layer (PHY) layer functionality are provided by communication interface 260.

Representatively, MID logic 300 includes MID transfer logic 310 to initiate a move of an MID established by user/target platform 200 using MID establishment logic 340. In one embodiment, MID establishment logic 440 enables the definition of an MID with a resource description defined in a known format (for example, extensible mark-up language (XML)). In one embodiment, the resource description requires the presence of trusted storage on a target platform to provide secure storage of the established MID if moved to, for example, target platform 200-2. Although illustrated as separate from chipset 210, MID logic 300 may be implemented within chipset 210 or may be provided as firmware or software running in a secure portion of user/target platform 200 or a non-secured partition of the platform.

As shown in FIG. 3, MID access logic 350 provides capabilities for using MID 254 for providing access to wireless networks, Internet resources, device resources or other like digital services requiring protected access. Accordingly, in one embodiment, MID logic 300, as shown in FIG. 3, enables establishment of a platform-independent MID, which may combine the various assertions, preferences, resource dependencies, mechanisms that use assertions and policies to define the access levels (MID) to enable a user to seamlessly access the digital world to gain desired access to various services desired by the user without being constrained by a multitude of usernames, passwords, certificates or other like device or user identification data.

Figure 4:
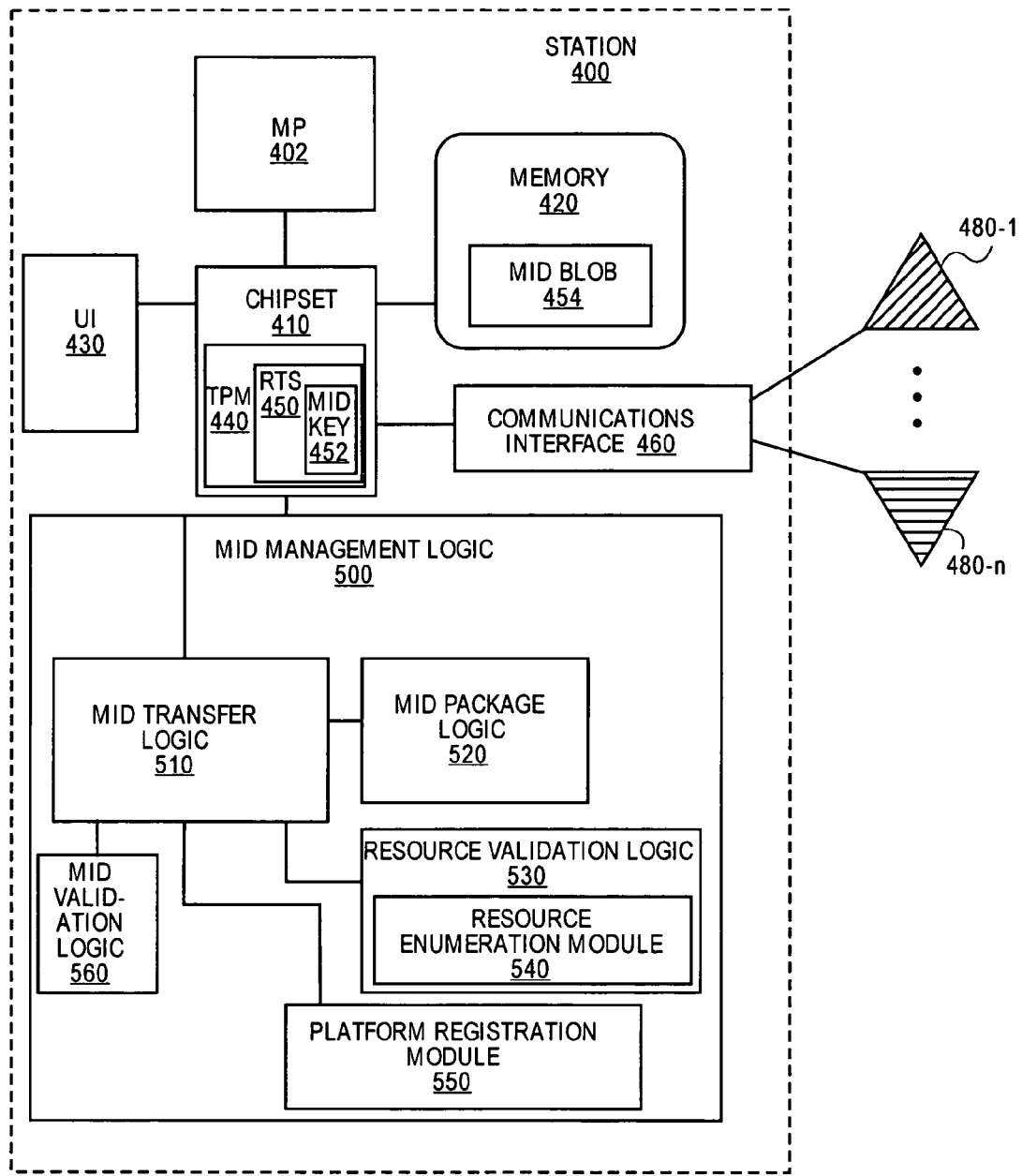
FIG. 4 is a block diagram further illustrating a user/target platform of FIGS. 1 and 2, in accordance with one embodiment.

FIG. 4 is a block diagram further illustrating MID manager platform 400 to support an for platform-independent identity manageability, in accordance with one embodiment. Representatively, MID manager platform 400 includes similar components to user/target platform 200, including microprocessor 402, chipset 410, memory 420, user interface (IU) 430 and communications interface 460. However, in contrast to user/target platform 200, MID manager platform 400 includes MID management logic 500 to enable transfer of platform-independent MIDs.

As shown in FIG. 4, MID manager platform 400 includes MID management logic 500 to provide an MID framework to manage the way MIDs are accessed, updated and operated, for example, by user/target platform 200, as shown in FIGS. 1 and 2. In one embodiment, MID management logic 500 includes MID transfer logic 510 to provide the ability to move an MID from, for example, a user platform 200-1 to a non-compatible target platform 200-2 to allow the MID to perform its required functions on the target platform 202-2.

Representatively, once an MID has been established within a user platform, such as, for example, user platform 200, as shown in FIGS. 1 and 2, MID management logic 500 ensures that the MID established on the user platform 200-1 can be successfully and securely moved to target platform 200-2. In one embodiment, MID validation logic 560 performs validation of the MID, established within user platform 200-1 and invokes resource validation logic 530 to query available resources of target platform 200-2 using, for example, resource enumeration module 540.

In one embodiment, as part of the process of moving an MID from user platform 200-1 to target platform 200-2, platform registration module 550 is used by MID manager platform 400 to register both the user platform 200-1 and the target platform 200-2 to initiate the move of the MID from the user platform 200-1 to the target platform 200-2. Although illustrated as separate from chipset 410, MID management logic 500 may be implemented within chipset 410 or may be provided as firmware or software running in a secure portion of MID manager platform 400 or a non-secured partition of the platform. In accordance with one embodiment, MID management logic 500 performs the life cycle management for registered MIDs residing on user platforms.

In one embodiment, MID manager platform 400, user platform 200-1 and target platform 200-2 include a trusted hardware device (THD). The Trusted Computing Group (TCG) has developed a standard to provide the industry with a set of operation conditions that enables trust in computer platforms and environments. In accordance with a TCG Specification entitled "Main Specification Version 1.2," published on Apr. 28, 2004, each personal computer (PC) is implemented with a trusted hardware device referred to as a Trusted Platform Module (TPM). In one embodiment, the THD of MID manager platform 400, user platform 200-1 and target platform 200-2 is a TPM, as defined by the TCG Specification.

As further illustrated in FIG. 3, user/target platform 200 includes roots of trust storage (RTS) 250. The proposed behavior of a TCG enabled device requires roots of trust or components that must be trusted because misbehavior of such components may not be detected. As defined by the TCG, there are commonly three roots of trust in a trusted platform: a root of trust for measurement (RTM), a root of trust for storage (RTS) and a root of trust for reporting (RTR). The root of trust for storage, or RTS 250, protects keys and data entrusted to TPM 240. The RTS 250 manages a small amount of volatile memory where keys are held while performing signing and decryption operations. Inactive keys may be encrypted and moved off-chip to make room for other more active keys.

Hence, it is important to understand that all keys do not reside with the TPM 240 simultaneously. Rather, when they are created, they are assigned a parent storage key. The parent key is used to encrypt private components of the new key so it can be stored outside the TPM 240 as a "key blob" and remain protected. When needed, the key blob is reloaded and decrypted by the same parent key using operations such as TPM_Loadkey. A single parent key can protect any number of Child Keys and these child keys may have no relation to each other except that they are protected by the same Parent Key. However, an association may be created by the fact that the same Parent Key protects all of them; therefore, the authorization data required to use the Parent Key is required to load it's Child Keys.

A TPM_Seal operation is where the external data is presented to the TPM, and in different operations, the TPM encrypts the external data using the public part of a storage key. The primary security property of this operation is the data "sealed" is available only on the specific platform containing the Storage key because the TPM will not perform the seal or unseal operation using a migratable key. The TPM_Unbind operation decrypts, using the private part of a key, a blob that was encrypted by an entity outside the TPM using the associated public key. It is important to note that in both the "seal" and "bind" operations, the contents of the data to be operated upon are opaque to the TPM; i.e., the TPM does care or peek at the data.

Referring again to FIG. 3, MID registration logic 320 provides registration capability to register a user platform 200-1 to enable validation of an MID established within the platform. In one embodiment, establishment of the MID requires that the MID is protected by a trusted storage, such as TPM 240, as shown in FIGS. 3 and 4. Representatively, TPM 240 includes RTS 250 to store an MID storage key 252, which is used to seal the MID blob 254 established on the user platform 200. Representatively, the MID is encrypted and stored within memory 220 as MID blob 254. Accordingly, in one embodiment, an MID is validated if it is stored, for example, as an MID blob 254 within non-volatile memory 220 of a user platform 200-1.

Figure 5:
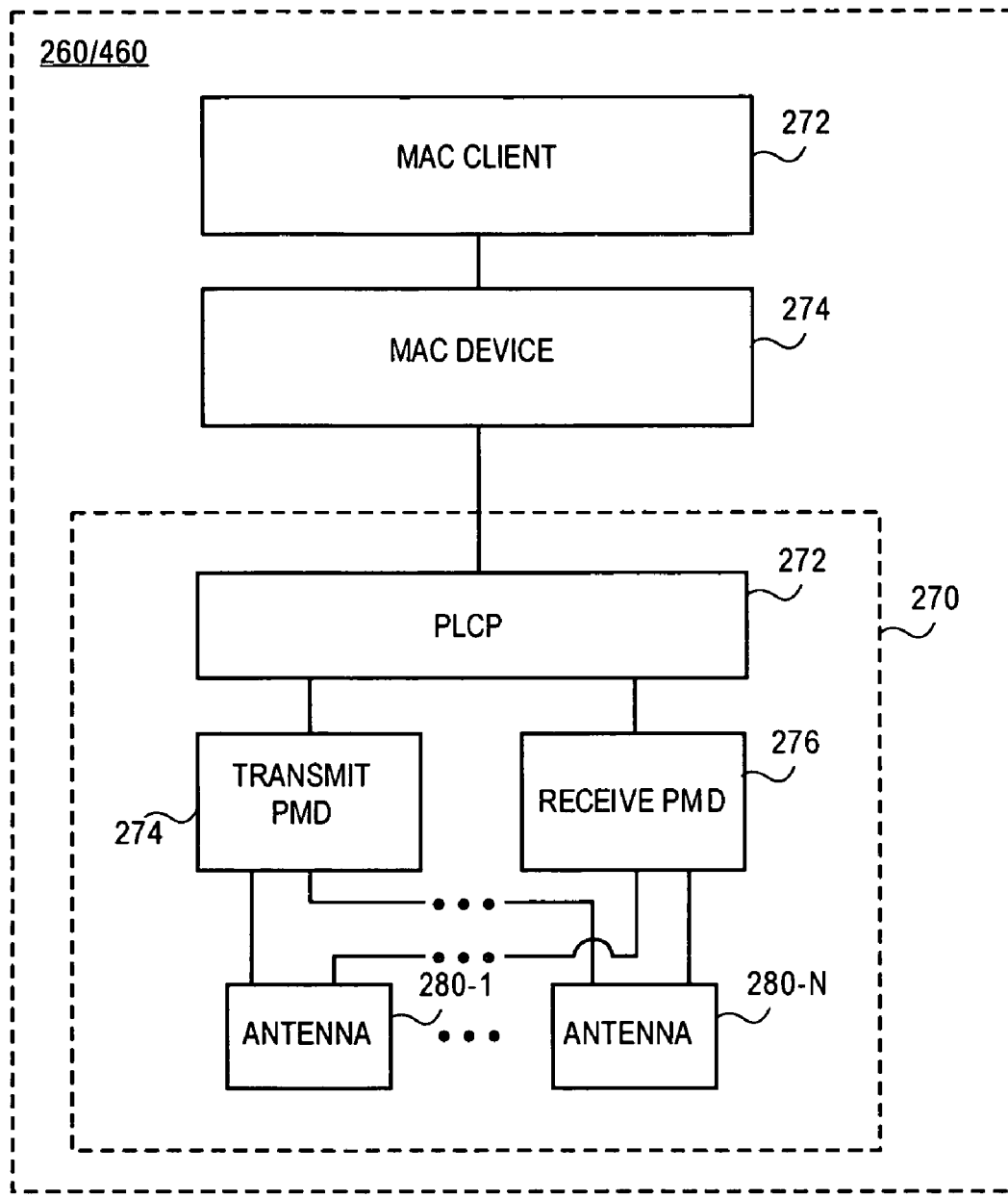
FIG. 5 is a block diagram further illustrating the communications interface of FIGS. 3 and 4, in accordance with one embodiment.

FIG. 5 is a simplified block diagram further illustrating communications interface 260, as shown in FIGS. 3 and 4, in accordance with one embodiment. Any WLAN station 200/400 may provide support for IEEE 802.11 Standard by including a physical layer (PHY) signaling control device (PHY device) 260, a medium access control (MAC) device 264, and a MAC client 262. Representatively, communications interface 260 supports station services, which are provided by PHY device 270 and MAC device 264, and used by MAC client 262. These services may include authentication, deauthentication, privacy, and delivery of data The MAC client 262 creates and processes data, among other things. The purpose of the PHY and MAC devices 270, 264 is to ensure that two network stations are communicating with the correct frame format and protocol. An IEEE Std. 802.11 defines the communication protocol between network stations.

The function of the PHY device 270 is threefold: 1) to provide a frame exchange between the MAC 264 and PHY 270 under the control of a physical layer convergence procedure (PLCP) sublayer; 2) to transmit data frames over the air interface under the control of the physical medium dependent (PMD) sublayer; and 3) to provide a carrier sense indication back to the MAC 264 so the MAC 264 is able to verify activity on the air interface. In one embodiment, PHY device is modified to provide a combined rate and TX antenna selection mechanism.

In general, the PHY device 270 includes PLCP apparatus 272, and transmit and receive PMD apparatuses 272, 274. Each of these may or may not use some or all of the same physical circuitry (e.g., processors, busses, clocks, storage, etc.). In addition, a plurality of antennas 280 (280-1, . . . , 280-N) may be interconnected with PMD apparatus 272, 274. Procedural methods for implementing one or more embodiments are now described.

Operation

Figure 6:
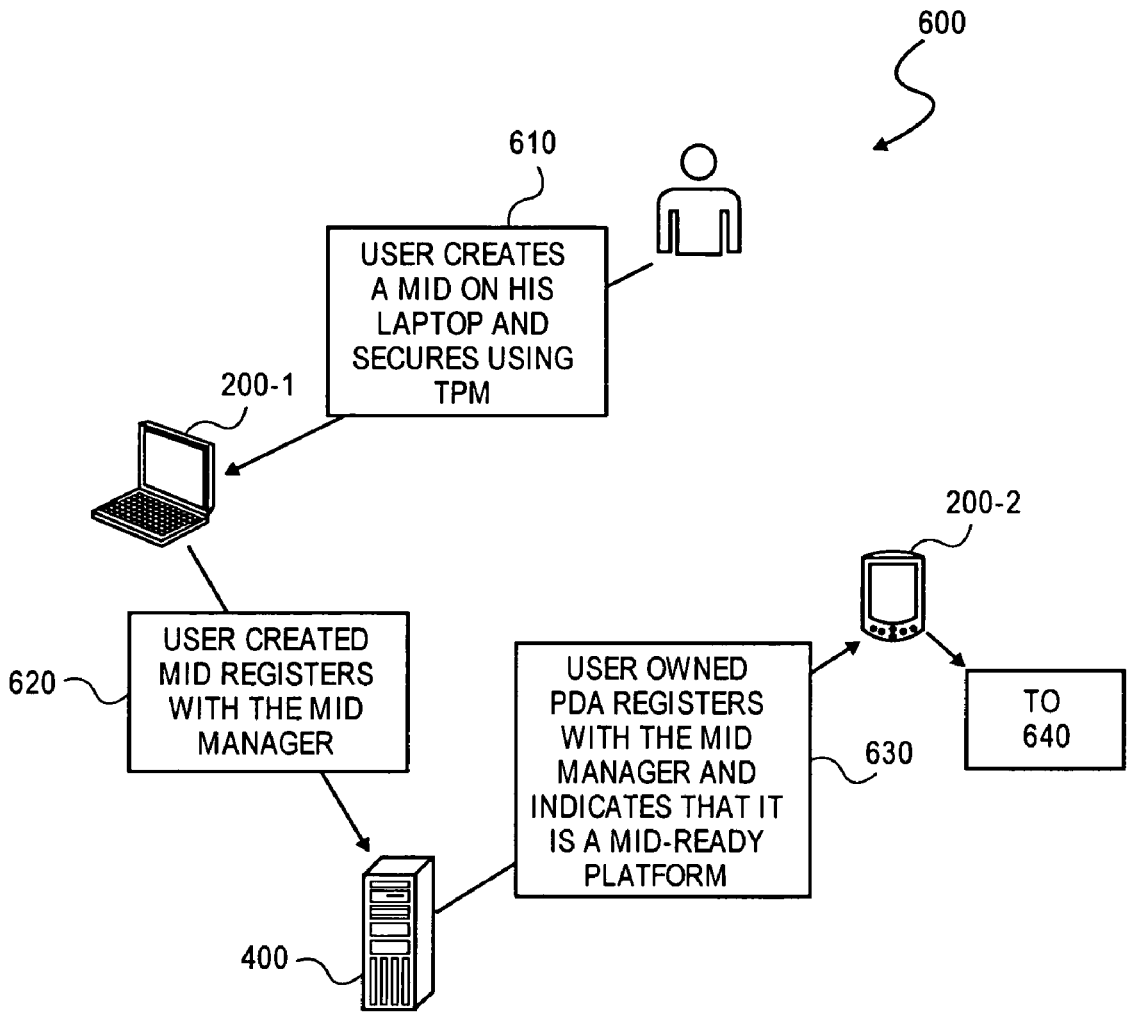
FIG. 6 is a flowchart illustrating a method for creating and registering a platform-independent MID, in accordance with one embodiment.

Turning now to FIG. 6, the particular methods associated with embodiments of the invention are described in terms of computer software and hardware with reference to a flowchart. The methods to be performed by a computing device (e.g., a wireless station) may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 6 is a flowchart illustrating a method 600 for platform-independent identity manageability, in accordance with one embodiment. In the embodiments described, examples of the described embodiments will be made with reference to FIGS. 1-5. However, the described embodiments should not be limited to the examples provided to limit the scope of the various embodiments, as defined by the appended claims.

Referring again to FIG. 6, at process block 610, a user creates a platform-independent MID on a user platform and secures the MID using a TPM. For example, as shown in FIG. 3, MID establishment logic 340 enables the establishment of a platform-independent MID, which is stored as MID blob 254 within non-volatile memory 220 of user platform 200. Representatively, a MID storage key 252, which is used to seal the MID as MID blob 254, is contained within RTS 250 of TPM 240. Once established, at process block 620, the user registers the MID with, for example, MID manager 400, as shown in FIG. 4.

In one embodiment, MID registration is performed using MID registration logic 420 (FIG. 4) and corresponding MID registration logic 350, as shown in FIG. 3. At process block 630, the user registers the target platform 200-2 to which the user desires movement of the MID to indicate that resources of the target platform meet resource requirements of the established MID. Although FIG. 6 illustrates user establishment of the platform-independent MID on user platform 200-1, in an alternative embodiment, the platform-independent MID is assigned to the user platform 200-1 by a trusted identity provider, such as, for example, MID manager platform 400. Following registration of target platform 200-2, at process block 630, control flow transitions to a method 640, as shown in FIG. 7.

Figure 7:
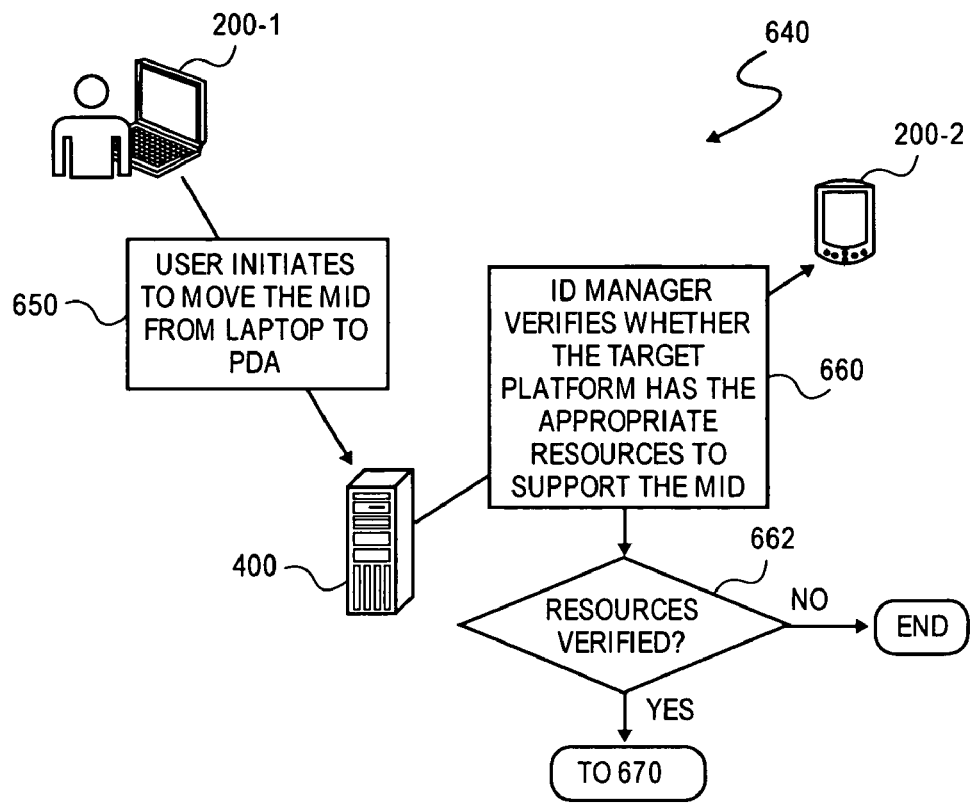
FIG. 7 is a flowchart illustrating a method for resource verification of a target platform in response to a user request to move a platform-independent MID to the target platform, in accordance with one embodiment.

As illustrated in FIG. 7, at process block 650, the user may initiate a move of the MID from user platform 200-1 to the target platform 200-2 using, for example, MID transfer logic 310 (FIG. 3). Once initiated, the MID manager platform 400 may perform validation of the MID using MID validation logic 560 (FIG. 4,) for example, to ensure that the MID is held within trusted storage of the user platform 200-1. Once validated, at process block 660, the MID manager platform 400 may perform resource validation of the target platform 200-2 using, for example, resource validation logic 530 (FIG. 4.)

As shown in FIG. 4, In one embodiment, resource validation logic 530 includes resource enumeration module 540. However, in an alternative embodiment, resource enumeration module is contained within MID logic 300, as shown in FIG. 3, of target platform 200-2. In one embodiment, resource enumeration module 540 queries the target platform for available resources. In response, the target platform returns an enumerated list of available resources. In response, MID validation logic 360 performs a resource requirement check to determine whether the MID can be securely moved and securely maintained within the target platform 200-2.

Figure 8:
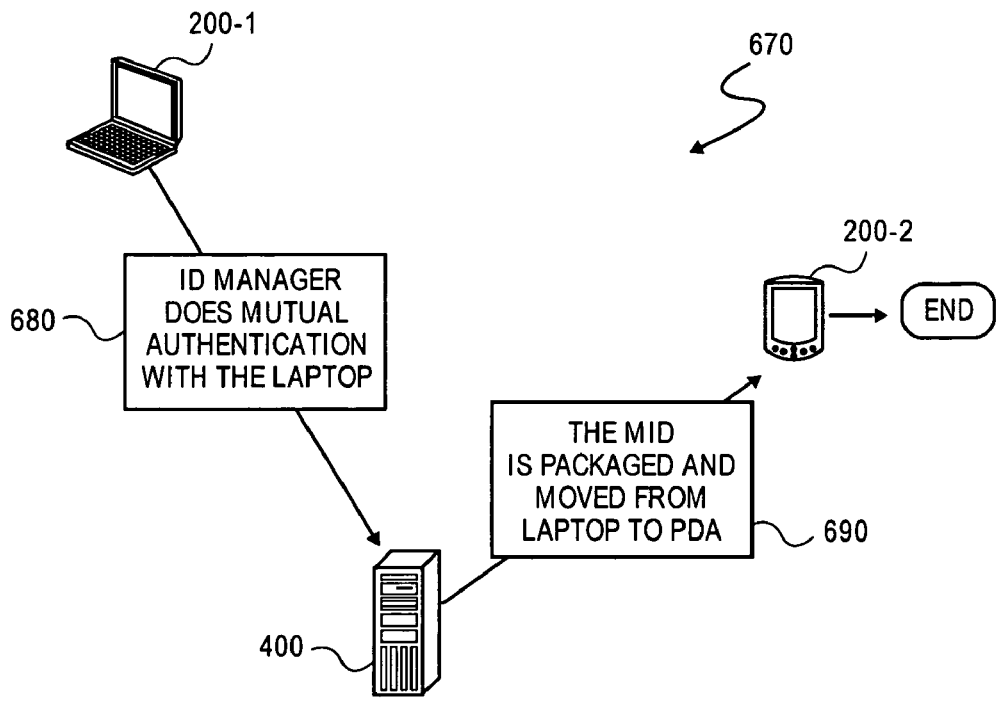
FIG. 8 is a flowchart illustrating a method for moving a platform-independent MID from a user platform to trusted storage of a target platform, in accordance with one embodiment.

In one embodiment, the MID validation logic verifies whether the target platform meets requirements. In one embodiment, such requirements include the presence of trusted storage, such as, for example, TPM 240/440, as shown in FIGS. 3 and 4. In one embodiment, the detection of, for example, a TPM within the target platform ensures that the MID may be securely moved from the user platform 200-1 to the target platform 200-2. Accordingly, at process block 662, if the resources of target platform 200-2 are verified, control follow branches to method 670, as shown in FIG. 8, As shown in FIG. 8, at process block 680, MID manager platform 400 may perform mutual authentication with the user platform 200-1 using, for example, MID transfer logic 510. Once mutual authentication is performed, MID package logic 520 may be used to package the MID to move the MID from the user platform 200-1 to the target platform 200-2, as shown at process block 690.

Accordingly, in one embodiment, MID management logic 500, in combination with MID logic 400, enable the creation of a platform-independent MIDs and provide life cycle management of these platform-independent MIDs, which can scale a wide variety of platforms. Accordingly, by creating platform-independent MIDs, services may be generated by service/identity providers and different devices or categories of a device.

Furthermore, using, for example, MID access logic 350, as shown in FIG. 3, the user platform, and subsequent to the move of the platform-independent MID, the target platform 200-2 may seamlessly access various environments. Accordingly, seamless access of the various environments may be provided by using the platform-independent MID in combination with MID access logic 350, as shown in FIG. 3, to perform some form of platform or/and user identification to gain access.

Figure 9:
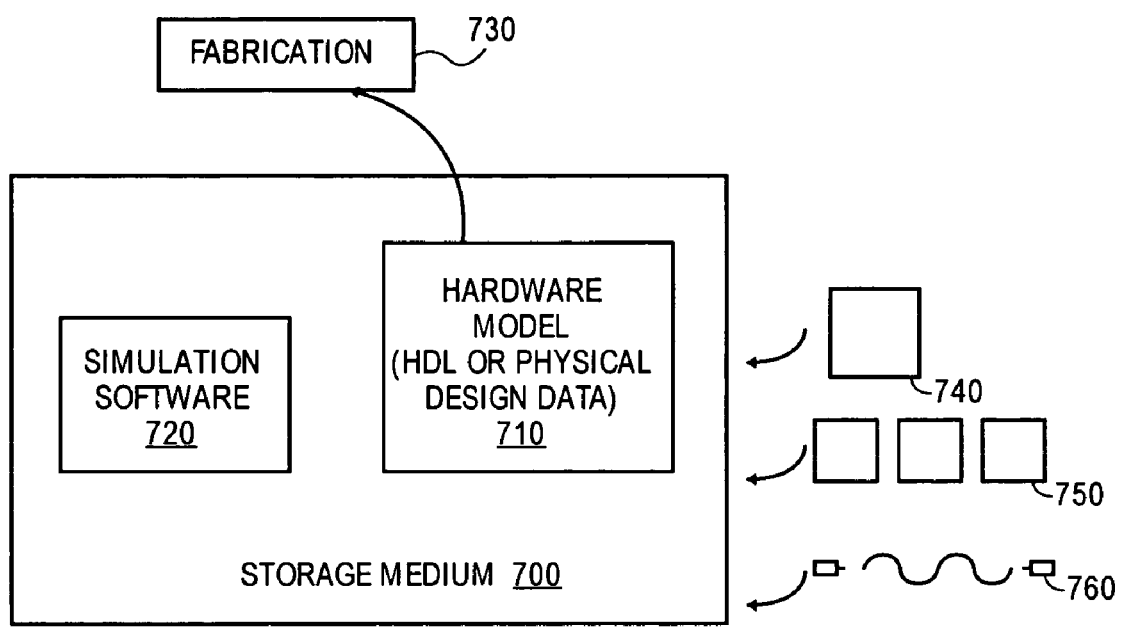
FIG. 9 is a block diagram illustrating various design representations or formats for simulation, emulation and fabrication of a design using the disclosed techniques.

FIG. 9 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 710 may be stored in a storage medium 700, such as a computer memory, so that the model may be simulated using simulation software 720 that applies a particular test suite 730 to the hardware model to determine if it indeed functions as intended. In some embodiments, the simulation software is not recorded, captured or contained in the medium.

In any representation of the design, the data may be stored in any form of a machine readable medium. An optical or electrical wave 760 modulated or otherwise generated to transport such information, a memory 750 or a magnetic or optical storage 740, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the above detailed description of various embodiments of the invention, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments of the invention is defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. A method comprising:
   establishing a platform-independent manageable identity (MID) of a user on a first platform, the platform independent MID held within trusted storage of the first platform;
   registering a second platform of the user with an MID manager platform; and
   moving, by the MID manager platform, the platform-independent MID to trusted storage of the second platform according to the user request, and if available resources of the second platform meet resource requirements of the MID, enable support of the platform-independent MID to securely store the same MID of the user on both the first and second platforms of the user such that the MID is not constrained to just one single platform.

2. The method of claim 1, wherein establishing the MID further comprises:
   registering the MID with the MID manager platform; and
   issuing a request to the MID manager platform to move the platform-independent MID to the second platform.

3. The method of claim 1, wherein registering the second platform further comprises:
   validating, by the MID manager platform, the platform-independent MID according to a received user request to move the MID to the second platform;
   invoking, by the MID manager platform, a resource enumerator module to query for available resources of the second platform; and
   issuing a resource verification to determine whether the available resources of the second platform meet resource requirements of the platform-independent MID.

4. The method of claim 1, wherein moving the MID further comprises:
   authenticating, by the MID manager platform, the first platform;
   packaging the MID; and
   moving the packaged MID to the second platform during a secure communication session established with the second platform.

5. The method of claim 1, wherein the MID is assigned to the first platform by the MID manager platform.

6. An article of manufacture comprising a machine-accessible storage medium having associated program code, wherein the program code, when executed, results in a machine performing:

validating a platform-independent manageable identity (MID) of a user that is held within trusted storage of a first platform of the user, according to a user request to move the MID to a second platform of the user;

verifying that available resources of the second platform meet resource requirements of the MID held within the trusted storage of the first platform; and moving the MID from the first platform to trusted storage of the second platform to securely store the same MID of the user on both the first and second platforms of the user such that the MID is not constrained to just one single platform.

7. The article of manufacture of claim 6, wherein the machine-accessible storage medium further includes data, which when accessed by the machine, further results in the machine performing:

assigning the MID to the first platform; and storing, by the first platform, the MID within sealed storage of a trusted platform module (TPM) of the first platform.

8. The article of manufacture of claim 6, wherein verifying the available resources of the target platform further results in the machine performing:

invoking a resource enumerator to query for the available resources of the second platform; and issuing a resource verification to determine whether the available resources of the second platform meet resource requirements of the MID.

9. The article of manufacture of claim 6, wherein moving the MID further results in the machine performing:

authenticating the first platform;

packaging the MID; and establishing a secure communication session with the second platform to move the packaged MID to the sealed storage provided by a trusted platform module (TPM) of the second platform.

10. The article of manufacture of claim 6, wherein the machine-accessible storage medium further includes data, which when accessed by the machine, further results in the machine performing:

accessing, by the second platform, a protected resource using the MID moved from the first platform to the second platform.

11. A system comprising:

a first platform, including manageable identity (MID) logic to establish at least one platform-independent MID of a user within trusted storage of the first platform of the user;

a second platform of the user, including trusted storage; and an MID manager platform registered by the second platform of the user, to move the platform-independent MID from the first platform to the trusted storage of the second platform, according to the user request, to securely store the same MID of the user on both the first and second platforms of the user if available resources of the second platform meet resource requirements of the MID such that the MID is not constrained to just one single platform.

12. A system of claim 11, wherein the MID manager platform further comprises:

MID validation logic to validate an MID held within the trusted storage of the first platform according to a user request to move the platform-independent MID from the first platform to the trusted storage of the second platform.

13. The system of claim 11, wherein the user platform further comprises:

a trusted platform module (TPM), including a processor and a non-volatile memory to provide sealed storage of at least one platform-independent MID.

14. The system of claim 11, wherein the target platform further comprises:

a trusted platform module (TPM), including a processor and a non-volatile memory to provide sealed storage of the platform-independent MID.

15. The system of claim 11, wherein the MID manager platform further comprises:

MID transfer logic to authenticate the first platform, to package the MID, and to move the packaged MID to the second platform during a secure communication session established with the second platform.

16. The system of claim 11, wherein the second platform further comprises:

resource verification logic to provide an enumerated list of available target platform resource according to a resource validation request issued by the MID manager platform.

17. The system of claim 11, wherein the target platform further comprises:

resource verification logic to invoke a resource enumerator module to query for available resources of the second platform and to issue a resource verification to determine whether the available resources of the second platform meet resource requirements of the platform-independent MID.

18. The system of claim 11, wherein the first platform further comprises:

MID transfer logic to register the platform-independent MID with the MID manager platform and to issue a request to the MID manager platform to move the MID from the first platform to the trusted storage of the second platform.

19. The system of claim 11, further comprising:

a network coupled to the first platform and the MID manager platform; and an access point coupled to the network.

20. The system of claim 19, wherein the target platform further comprises:

a communications interface coupled to a plurality of antennas for over-the-air (OTA) communication with the access port; and a chipset including a trusted platform module (TPM), the chipset to receive the platform-independent MID from the SD manage platform via the communications interface and to store the platform-independent MID within sealed storage provided by the TPM.

* * * * *